(12) United States Patent
Speece

(10) Patent No.: US 10,584,045 B1
(45) Date of Patent: Mar. 10, 2020

(54) CONVERSION OF SECONDARY CLARIFIER INTO AN OXIC BIOREACTOR BY SUPEROXYGENATION

(71) Applicant: Richard E. Speece, Nashville, TN (US)

(72) Inventor: Richard E. Speece, Nashville, TN (US)

( * ) Notice: Subject to any disclaimer, the term of this patent is extended or adjusted under 35 U.S.C. 154(b) by 0 days.

(21) Appl. No.: 16/370,254

(22) Filed: Mar. 29, 2019

(51) Int. Cl.
*C02F 3/12* (2006.01)
*C02F 3/26* (2006.01)
*B01F 3/04* (2006.01)

(52) U.S. Cl.
CPC ........ *C02F 3/1278* (2013.01); *B01F 3/04099* (2013.01); *C02F 3/121* (2013.01); *C02F 3/26* (2013.01); *C02F 2209/225* (2013.01)

(58) Field of Classification Search
CPC .. B01F 3/04099; B01F 3/0446; C02F 3/1278; C02F 3/121; C02F 3/006; C02F 1/727; C02F 3/12; C02F 3/26; C02F 3/302
USPC ................................................ 210/621, 626
See application file for complete search history.

(56) References Cited

U.S. PATENT DOCUMENTS

| | | | |
|---|---|---|---|
| 2007/0235386 A1* | 10/2007 | Barnes | C02F 3/308 210/605 |
| 2011/0015913 A1* | 1/2011 | Yamashita | C02F 3/006 703/11 |
| 2013/0233809 A1* | 9/2013 | Graham | C02F 3/26 210/758 |

* cited by examiner

*Primary Examiner* — Claire A Norris
(74) *Attorney, Agent, or Firm* — Innovation Capital Law Group, LLP; Vic Lin

(57) ABSTRACT

An apparatus and method for oxygenating a flow of mixed liquor, typically from an aeration tank, to a secondary clarifier permits further biological reduction of biochemical oxygen demand (BOD) of a waste stream, such as waste water while resident in the secondary clarifier. In some embodiments, the mixed liquor may be oxygenated to levels at or above about 4 mg/L. Depending upon the user requirements and the BOD of the waste stream, all or a portion of the mixed liquor may be treated to raise the dissolved oxygen content. Various apparatus may be used for superoxygenation, including, as one example, a superoxygenation cone, such as a Speece cone.

21 Claims, 1 Drawing Sheet

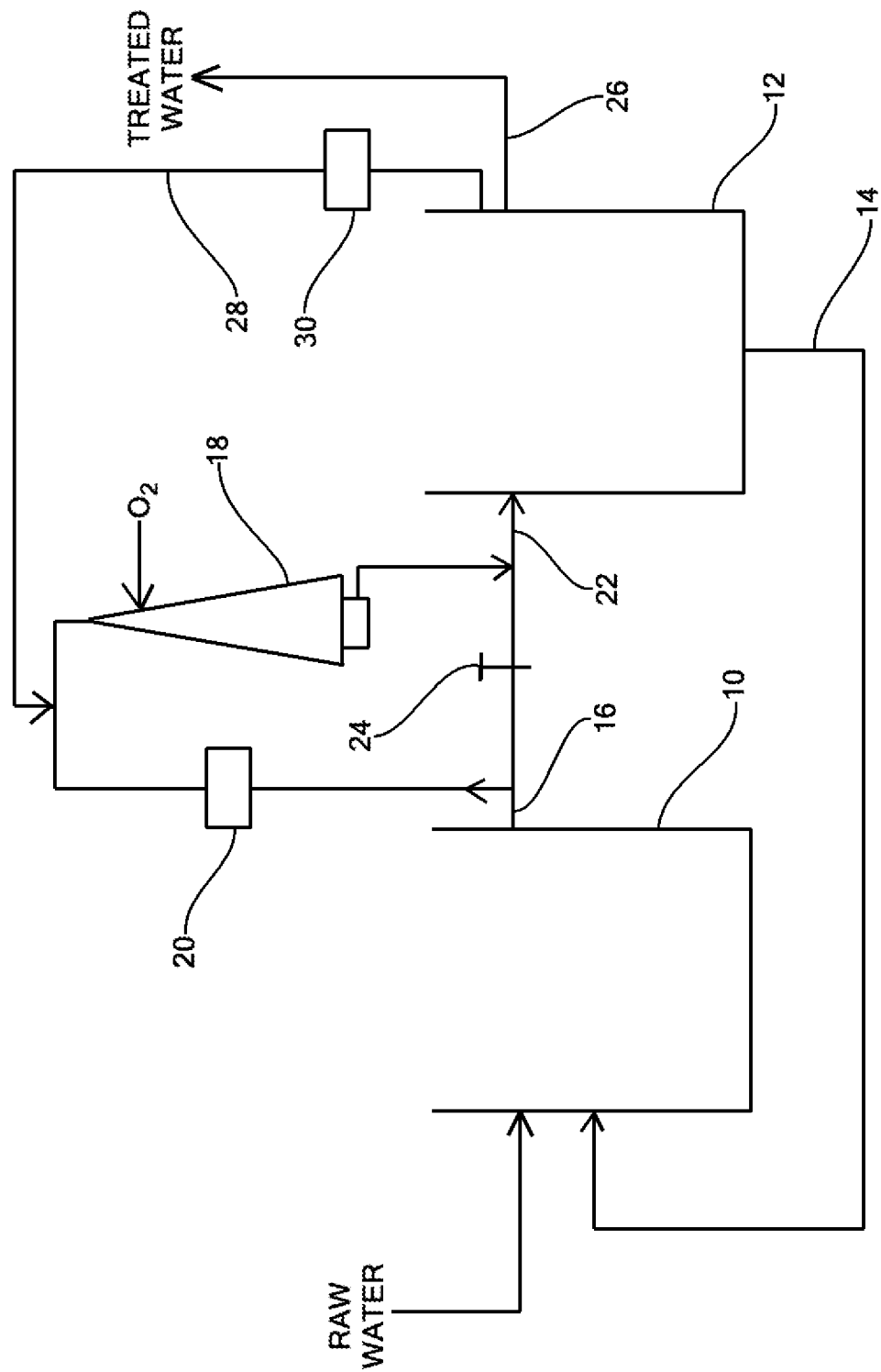

CONVERSION OF SECONDARY CLARIFIER INTO AN OXIC BIOREACTOR BY SUPEROXYGENATION

BACKGROUND OF THE INVENTION

1. Field of the Invention

Embodiments of the invention relates generally to wastewater treatment apparatus and processes. More particularly, the invention relates to methods and apparatus for converting a secondary clarifier into an oxic bioreactor by superoxygenation for additional treatment in a secondary clarifier.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The activated sludge process is over 100 years old, but higher levels of dissolved oxygen (DO) have never been supplemented to the secondary clarifier influent mixed liquor above what it already contains, so that the secondary clarifier operates as an oxic bioreactor for the following reasons Conventionally, the secondary clarifier is operated with an aeration tank that provides the oxygen required for the aerobic removal of biochemical oxygen demand (BOD). The bacteria in the aeration tank do not need more than 2 mg/L of DO to work near their maximal capacity. In addition, the oxygen transfer energy consumption per unit weight of oxygen dissolved is in proportion to the dissolved oxygen deficit. Therefore, the lower the DO in the aeration tank, the less energy is required to dissolve a unit weight of DO. Consequently, it is conventional practice to maintain about 2 mg/L of dissolved oxygen in the aeration tank. Thus, the dissolved oxygen concentration of the mixed liquor flowing from the aeration tank into the secondary clarifier is on the order of about 2 mg/L.

The secondary clarifier conventionally provides for the physical settling of the bacteria out of the mixed liquor of the wastewater flow. The concentrated bacteria in the underflow of the secondary clarifier are recycled back to the head end of the aeration tank to use them again in the aeration tank. This ability to concentrate and capture the bacterial floc is at the heart of the activated sludge process. Since the dissolved oxygen in the influent to the secondary clarifier is so low, e.g., less than 2 mg/L, there is negligible aerobic biological removal of BOD in the secondary clarifier. The secondary clarifier thus has operated as a physical unit operation only.

It is noteworthy that the mass of sludge in the secondary clarifier can be ⅓ of that in the aeration tank. However, due to quiescent conditions that must be maintained in the clarifier and the minimal levels of electron acceptors available (dissolved oxygen or nitrate), under conventional conditions, the secondary clarifier cannot operate as an oxic bioreactor.

It is advantageous to operate the secondary clarifier with a sludge blanket as deep as possible to achieve the maximum concentration of solids in the return sludge being recycled back to the head of the aeration tank. A deeper sludge blanket also facilitates superior filtration of the final effluent through the sludge blanket, resulting in more efficient capture of suspended solids and producing a better quality of effluent suspended solids.

When DO is the electron acceptor, the final carbon dioxide product is quite soluble and tends to remain in solution in a quiescent tank. In the absence of DO, denitrification may occur. When nitrates are the electron acceptor, the end product is nitrogen gas which is quite insoluble, tending to come out of solution resulting in a dissolved air flotation phenomenon of 'rising sludge' within the secondary clarifier. This results in increased suspended solids in the effluent. To prevent this, the sludge blanket must be kept shallow and therefore, the return sludge concentration is less. Therefore, the operator must live with shallower sludge blankets and consequently lower solids concentration in the return sludge and thus lower the mixed liquor suspended solids (MLSS) in the aeration tank.

The aeration tank is designed for a specified mass inventory of bacterial sludge that is based upon the mass of BOD to be treated in the incoming wastewater. Commonly, this ratio of pounds of BOD per day to be treated per pound of bacterial sludge inventory, called the food to microorganism ratio (F/M), is on the order of about 0.3 to 1.0 pounds of BOD per day per pound of bacterial sludge in the system. The mass of bacterial sludge in the system is the product of the volume of the aeration tank times the concentration of the mixed liquor bacterial floc. Thus, the higher the concentration of the mixed liquor suspended solids, the lower is the requirement for aeration tank volume. For example, if the mixed liquor concentration can be doubled, the volume of the aeration tank can be cut in half.

From this it can be seen that the concentration of the return sludge from the secondary clarifier is a key variable in the operation of the plant. The thicker the return sludge, the higher is the mixed liquor bacterial concentration inventory in the reactor.

To achieve minimal suspended solids in the effluent, the top of the sludge blanket must be kept sufficiently below the effluent weirs to prevent solids from the sludge blanket being swept over the effluent weirs. To maximize the sludge concentration being pulled out of the bottom of the clarifier, the sludge blanket must be maintained as deep as is practically possible. Optimal operation of the secondary clarifier is achieved by maintaining as deep a sludge blanket as possible to enhance the concentration of the sludge concentration drawn off the bottom of the tank, while minimizing the loss of suspended solids in the discharge to the receiving waters.

Conventionally, only the inventory of sludge in the aeration tank can be used for BOD removal because the amount of dissolved oxygen in the mixed liquor going into the aeration tank is so low, e.g., 2 mg/L. Thus, even though a considerable inventory of sludge is available in the secondary clarifier, it cannot contribute to BOD removal for lack of DO.

In view of the foregoing, there is a need for an apparatus and process that can take advantage of the sludge inventory in the secondary clarifier to provide continued waste water treatment in the secondary clarifier.

SUMMARY OF THE INVENTION

As noted above, due to quiescent conditions that must be maintained in the clarifier and the minimal levels of electron acceptors available (dissolved oxygen or nitrate), under conventional conditions, the secondary clarifier cannot operate as an oxic bioreactor. This would change if a very high level of DO was added to the influent to the secondary clarifier. Since the essential conditions within a secondary clarifier must be quiescent to facilitate the settling out of the activated sludge, the only opportunity to alter conditions in the secondary clarifier would have to occur in the mixed liquor flow before entering the secondary clarifier.

Superoxygenation is the increasing of the DO in water to much above the air saturation level of 9 mg/L to as high as 80 mg/L or higher, using pure or enriched oxygen and hydrostatic pressure achieved in an efficient gas transfer chamber. One example of a superoxygenation chamber is a superoxygenation cone referred to as the so-called Speece Cone. It should be noted that spontaneous effervescence does not occur below this higher level and the DO is retained in solution. Thus, embodiments of the present invention provide a method and apparatus for the oxygenation of the mixed liquor flow before it enters the secondary clarifier.

Embodiments of the present invention provide a waste stream treatment apparatus comprising an aeration tank for receiving a waste stream; a secondary clarifier receiving an outflow from the aeration tank; and an oxygenation device operable to oxygenate the outflow from the aeration tank prior to being introduced to the secondary clarifier.

In some embodiments, the oxygenation device provides superoxygenation of the outflow.

In some embodiments, the superoxygenation results in a dissolved oxygen concentration of the outflow of at least 4 mg/L.

In some embodiments, the superoxygenation results in a dissolved oxygen concentration of the outflow of up to about 50 to about 80 mg/L.

In some embodiments, the oxygenation device oxygenates a portion of the outflow. In other embodiments, the oxygenation device oxygenates an entirety of the outflow.

In some embodiments, a fluid connection from the secondary clarifier can be used to oxygenate fluid from the secondary clarifier and re-introduce the oxygenated fluid back into the secondary clarifier.

Embodiments of the present invention further provide a method for the treatment of a waste stream comprising receiving the waste stream into an aeration tank; transferring an outflow from the aeration tank to a secondary clarifier; and oxygenating the outflow from the aeration tank prior to being introduced to the secondary clarifier to provide an oxic bioreactor from the secondary clarifier.

Embodiments of the present invention also provide a method for increasing a plant capacity for biochemical oxygen demand (BOD) without increasing overall tank volume comprising providing an aeration tank for receipt of a waste stream; and providing an oxygenating device configured to oxygenate an outflow from the aeration tank prior to being introduced to the secondary clarifier to provide an oxic bioreactor from the secondary clarifier.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

The FIG. illustrates an exemplary embodiment of an apparatus for the oxygenation of the mixed liquor flow from an aeration tank to a secondary clarifier.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an apparatus and method for oxygenating a flow of mixed liquor, typically from an aeration tank, to a secondary clarifier in order to permit further biological reduction of biochemical oxygen demand (BOD) of a waste stream, such as waste water. In some embodiments, the mixed liquor may be oxygenated to levels at or above about 4 mg/L. Depending upon the user requirements and the BOD of the waste stream, all or a portion of the mixed liquor may be treated to raise the dissolved oxygen content. Various apparatus may be used for superoxygenation, including, as one example, a superoxygenation cone, such as a Speece cone.

Three components may be used for converting an existing secondary clarifier into an aerobic microbiological reactor: dissolved oxygen (DO), bacteria and time. Thus, wherever there is a sludge blanket and the presence of DO, this may become an aerobic bioreactor in proportion to the residence time of the sludge blanket in the secondary clarifier. This is readily solved by superoxygenating the DO in the aeration tank effluent flow to as much as 50-80 mg/L going into the secondary clarifier, thus maintaining a positive DO concentration at all times and precluding denitrification causing rising sludge.

Consequently, if the DO was superoxygenated to the order of 50-80 mg/L and the sludge blanket was maximized, it would be possible keep the contents aerobic for the entire sludge blanket detention time, while accomplishing significant further BOD stabilization.

If a treatment plant was overloaded and enough DO was supplemented to the mixed liquor going into the secondary clarifier, no additional tank construction would be required to accommodate this overload. Oftentimes, there may be no space to construct additional tankage. If this was new construction, considerably less tank volume would be required for the aeration tank if the secondary clarifier was operated as an aerobic bioreactor as well as a clarifier as described in greater detail below.

Referring to the FIG., as an example, the following assumptions are used. Assume 8 hours hydraulic detention time in the aeration tank 10 and 2 hours hydraulic detention time in a 15 ft deep secondary clarifier 12 with a 50% sludge recycle ratio and an average suspended solids (SS) concentration in the secondary sludge blanket of 6000 mg/L. In order to prevent a problem of rising sludge, the sludge blanket depth in the secondary clarifier is limited to 5 ft and is able to concentrate the return sludge 14 to 7500 mg/L. Under these conditions there would be 6800 pounds of mixed liquor suspended solids (MLSS) per million gallons per day (MGD) of plant flow, in the aeration tank and 1400 pounds of SS in the secondary sludge blanket. The total sludge inventory under oxic conditions would only be 6800 pounds/MGD of plant flow, because the 1400 pounds in the secondary sludge blanket are not available for aerobic BOD metabolism because oxic conditions do not prevail under conventional operation.

Superoxygenation of the influent to the secondary clarifier at a sufficient concentration to maintain oxic conditions throughout the sludge blanket would make it now possible to increase the sludge blanket layer from 5 to 10 feet and enable the return sludge concentration to be increased from 7500 mg/L to 9000 mg/L with this deeper blanket. Under these conditions, the sludge inventory in the aeration tank would increase from 6800 to 8200 pounds per MGD of plant flow. The sludge blanket solids inventory in a secondary clarifier at a 10 ft depth would increase from 1400 to 2800 pounds per MGD of plant flow. Under these new modified conditions, the total sludge inventory under oxic conditions would be 8200+2800=11,000 instead of 6800 pounds/MGD of plant flow, because now the activated sludge in the secondary clarifier can be included because oxic conditions are maintained by superoxygenation of the influent.

Treatment capacity could be increased by about 60% using this modification which would require no increase in tankage volume but incorporate superoxygenation. This would likewise increase the biological safety factor for both BOD removal and nitrification in the facility. Thus, a very significant improvement in plant operation is possible through superoxygenation of the secondary clarifier influent.

Pure oxygen costs about $100 per ton, comparable to the cost of electricity utilized in dissolving a ton of DO using the conventional aeration process (~1000 kwhr/ton D.O. @ $0.10/kwhr). If the target DO is above about 5-7 mg/L, pure oxygen is more economical to dissolve into water than air. Furthermore, using pure oxygen makes possible very high DO concentrations that can solve water quality problems not possible using conventional aeration systems.

Using the oxygen available in air as the source of oxygen, the saturation DO concentration in water is about 9 mg/L at 20° F. The saturation DO concentration is approximately five times that concentration or about 45 mg/L. Since a DO concentration when pure oxygen as the source using pure oxygen of less than 45 mg/L is below saturation, it will remain in solution without the potential for effervescent loss because it is below 100% saturation. This was demonstrated at a field installation where the DO in the influent to a secondary clarifier was raised to 60 mg/L using pure oxygen and no effervescence and consequent gas flotation of sludge was observed. It turns out that effervescence of a dissolved gas only occurs at concentrations of above about ~200% of the saturation concentration. Furthermore, the hydrostatic pressure at the bottom of a 17 feet deep secondary clarifier is an additional 0.5 atm of pressure, so that DO saturation conditions of 67 mg/L prevail at that depth. Thus, it is possible to dissolve very high DO concentrations using pure oxygen to support significant aerobic metabolism in a quiescent secondary sludge blanket.

The Speece Cone technology can dissolve pure oxygen very efficiently (over 90%) while producing concentrations as high as 50 to 80 mg/L and retaining it in solution. The FIG. shows a schematic representation of a Speece Cone 18 installation used to superoxygenate the outflow 16 from an aeration tank 10 to a secondary clarifier 12. It some embodiments, all of the outflow 16 may be treated by the Speece Cone 18 to provide a superoxygenated inflow 22 into the secondary clarifier 12. In some embodiments, only a portion of the outflow 16 may be treated. Various methods of fluid control may be used to control the amount of outflow 16 treated, such as through the use of an automatic or manually operated valve 24, for example. In some embodiments, a pump 20 may be used to assist in the flow of the outflow 16 through the Speece Cone 18.

The treated water 26 may be removed for release and/or further treatment. In some embodiments, an effluent 28 from the secondary clarifier may be passed, via a pump 30, for example, through the superoxygenation cone 18 and re-introduced back into the secondary clarifier 12.

It should be noted that the FIG. illustrates an exemplary embodiment of the present invention. Optional components, such as the valve 24 and the flow of the effluent 28 back to the oxygenating device, for example, are shown as included but may be removed.

In the conventional aeration tank, BOD from the wastewater is removed by the bacterial cells in a relatively short period of time in the form of stored energy. Subsequently, the bacteria aerobically metabolize this stored BOD into carbon dioxide and water in the remaining detention time in the aerobic reactor. Depending upon the amount of time provided in the aeration tank, some or most of this stored BOD within the cells is metabolized. In a lowly loaded system, the bacteria are able to metabolize most of this stored BOD before entering the secondary clarifier. In a highly loaded system, a significant fraction of the stored BOD within the cells remains when the mixed liquor is transferred to the secondary clarifier.

A common modification of the activated sludge process, called contact stabilization, has been used for many years in conjunction with a highly loaded aeration tank. This situation results in considerable stored BOD within the bacterial cells when discharged to the secondary clarifier. It then provides an additional aeration contact tank where the return sludge from the bottom of the secondary clarifier is stabilized under aerobic conditions at high MLSS for a period of time before it is returned to the head of the aeration tank. In this aerobic contact stabilization tank, additional BOD stored within the bacterial cells is metabolized so that the bacteria then have maximum capacity to store a fresh supply of BOD once they are introduced back into the main aeration tank.

If a provision was made to maintain aerobic conditions throughout the sludge blanket in the secondary clarifier, as provided by embodiments of the present invention, the bacteria would then be able to consume the stored BOD within their cells while in the secondary clarifier. Thus, there would be no need for a separate aerated contact stabilization tank to accomplish the same purpose since it already would have occurred in the quiescent secondary clarifier sludge blanket if sufficient DO was supplemented to the influent of the secondary clarifier.

Most of the readily biodegradable BOD is removed in the aeration tank. Only the more difficult to degrade organics and stored BOD are left in the mixed liquor going into the secondary clarifier. Therefore, the rate of dissolved oxygen demand is proportionately lower but never zero. Thus, while the DO uptake rate at the head of an aeration tank may be 100 mg/L/hr, for example, this rate can drop considerably in the discharge from the aeration tank and in the sludge blanket in the secondary clarifier. All that is needed to achieve additional BOD removal is to provide the superoxygenation capacity to the influent to the secondary clarifier.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A waste stream treatment apparatus comprising:
   an aeration tank for receiving a waste stream;
   a secondary clarifier receiving an outflow from the aeration tank; and
   an oxygenation device operable to oxygenate, selectively, an entirety of or a portion of the outflow from the aeration tank prior to being introduced to the secondary clarifier; and
   a bypass line, connecting the aeration tank with the secondary clarifier and bypassing the oxygenation device.

2. The waste stream treatment apparatus of claim 1, wherein the oxygenation device provides superoxygenation of the outflow.

3. The waste stream treatment apparatus of claim 1, wherein the oxygenation device results in a dissolved oxygen concentration of the outflow of greater than 9 mg/L.

4. The waste stream treatment apparatus of claim 2, wherein the superoxygenation results in a dissolved oxygen concentration of the outflow from about 50 to about 80 mg/L.

5. The waste stream treatment apparatus of claim 1, wherein the oxygenation device is a superoxygenation device.

6. The waste stream treatment apparatus of claim 5, wherein the superoxygenation device is a Speece cone.

7. The waste stream treatment apparatus of claim 1, wherein the oxygenation device oxygenates a portion of the outflow.

8. The waste stream treatment apparatus of claim 1, wherein the oxygenation device oxygenates an entirety of the outflow.

9. The waste stream treatment apparatus of claim 1, further comprising a fluid connection from the secondary clarifier to the oxygenation device to oxygenate fluid from the secondary clarifier and re-introduce the oxygenated fluid back into the secondary clarifier.

10. A method for the treatment of a waste stream comprising:
    receiving the waste stream into an aeration tank;
    transferring a mixed liquor from the aeration tank to a secondary clarifier; and
    oxygenating, selectively, an entirety of or a portion of the mixed liquor from the aeration tank prior to being introduced to the secondary clarifier to provide an oxic bioreactor from the secondary clarifier, wherein a bypass line, connecting the aeration tank with the secondary clarifier and bypassing the oxygenation device, permits oxygenating the portion of the mixed liquor from the aeration tank by allowing a second portion of the mixed liquor from the aeration tank to pass directly to the secondary clarifier.

11. The method of claim 10, further comprising superoxygenating the mixed liquor.

12. The method of claim 10, wherein the oxygenating step results in a dissolved oxygen concentration of the outflow of greater than 9 mg/L.

13. The method of claim 11, wherein the superoxygenating step results in a dissolved oxygen concentration of the outflow from about 50 to about 80 mg/L.

14. The method of claim 10, wherein the step of oxygenating the mixed liquor uses a superoxygenation device.

15. The method of claim 14, wherein the superoxygenation device is a Speece cone.

16. The method of claim 10, further comprising controlling a first amount of the mixed liquor that is oxygenated and a second amount of the mixed liquor that is passed to the secondary clarifier without oxygenation.

17. The method of claim 10, further comprising flowing a portion of a secondary clarifier effluent through an oxygenation device and re-introducing the portion of fluid back to the secondary clarifier.

18. The method of claim 10, further comprising passing sludge from the secondary clarifier to the aeration tank.

19. A method for increasing a plant capacity for biochemical oxygen demand (BOD) without increasing overall tank volume, the method comprising:
    providing an aeration tank for receipt of a waste stream;
    providing an oxygenating device configured to oxygenate, selectively, an entirety of or a portion of an outflow from the aeration tank prior to being introduced to a secondary clarifier to provide an oxic bioreactor from the secondary clarifier; and
    providing a bypass line connecting the aeration tank to the secondary clarifier while bypassing the oxygenating device.

20. The method of claim 19, wherein the oxygenating device is a superoxygenation device operable to generate a dissolved oxygen concentration of greater than 9 mg/L.

21. A method of preventing denitrification and rising sludge in a secondary clarifier of an activated sludge process, the method comprising:
    providing an aeration tank for receipt of a waste stream;
    adding dissolved oxygen to a mixed liquor influent from the aeration tank to the secondary clarifier, wherein a concentration of the dissolved oxygen is sufficient to maintain a positive dissolved oxygen concentration in a sludge blanket in the secondary clarifier; and
    controlling the concentration of the dissolved oxygen by adjusting a bypass flow through a bypass line directly permitting outflow from the aeration tank to pass to the secondary clarifier without oxygenation thereof.

* * * * *